United States Patent Office 3,420,886
Patented Jan. 7, 1969

3,420,886
REARRANGEMENT OF CHRYSANTHENONE
William F. Erman, Springfield Township, Hamilton County, Ohio, assignor to The Procter & Gamble Company, Cincinnati, Ohio, a corporation of Ohio
No Drawing. Filed Jan. 13, 1967, Ser. No. 608,995
U.S. Cl. 260—586                                    1 Claim
Int. Cl. C07c *49/54;* C07c *49/50*

ABSTRACT OF THE DISCLOSURE

Chrysanthenone undergoes acid catalyzed rearrangement to form 2,6,6-trimethylbicyclo[3.2.0]hept-2-en-7-one.

Field of the invention

This invention relates to the preparation of 2,6,6-trimethylbicyclo[3.2.0]hept-2-en-7-one, hereinafter referred to as ketone II, a compound having valuable flavor and perfume characteristics. Heretofore ketone II has been prepared from the relatively expensive geranic acid in about a 28% yield and in an optically inactive form (see J. J. Beereboom, J. Org. Chem., 30, 4230 (1965), J. J. Beereboom, J. Am. Chem. Soc., 8, 3525 (1963), C. Balant, C. A. Vodoz, H. Kappeler, and H. Schinz, Helv. Chim. Acta, 34, 722 (1951).

Summary of the invention

By the process of this invention, ketone II can be produced in an optically active form and in a good yield by treatment of a solution of chrysanthenone (I) with a lower carboxylic acid or Lewis acid.

The reaction proceeds according to the following equation:

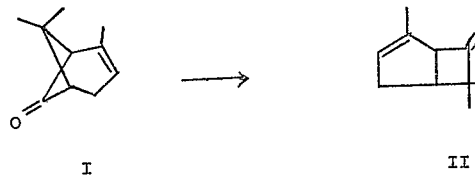

Chrysanthenone (I) is a known monoterpene readily prepared from α-pinene by these steps:

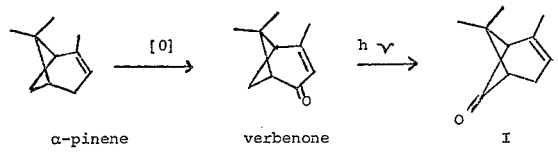

Verbenone may be prepared by any of several reported methods: i.e., the procedures of (1) G. H. Whitham, J. Chem. Soc., 2232 (1961); (2) G. Dupont, R. Dulou and O. Mondou, Bull. Soc. Chim. France, 60 (1953); (3) J. P. Bain and W. Y. Gary, U.S. Patent 2,767,215, Oct. 16, 1956; Chem. Abstr. 51, 8138 (1957); (4) Y. Sebe, J. Chem. Soc. Japan, 64, 909 (1943); (5) C. Paquot, Compt. Rend., 209, 171 (1939); (6) T. Matsuura and K. Fujita; J. Sci. Hiroshima Univ. Ser. A., 16, 173 (1952); Chem. Abstr., 48, 3307 (1954); (7) J. A. Retamar, Rev. Fac. Ing. Quim., Univ. Nacl. Litoral, Santa Fe, Arg., 29, 45 (1960); Chem. Abstr., 57, 16772 (1951); (8) Y. Fushizaki and M. Saito, Bull. Univ. Osaka Prefect. Ser. A, 6, 155 (1958); Chem. Abstr., 53, 4335 (1959); (9) V. Erofeev and A. I. Chirko, Uchenye Zapiski Beloruss. Gosudarst. Univ. im. V. I. Lenina Ser. Khim., No. 24, 3 (1955); Chem. Abstr., 51, 5734 (1957).

Verbenone can be converted to chryanthenone by the procedure of J. J. Hurst and G. H. Whitham, J. Chem. Soc., 2864 (1960) or by several variations in this procedure; W. F. Erman "Photochemical Transformations of Unsaturated Bicyclic Ketones. Verbenone and It's Photodynamic Products of Ultraviolet Irradiation," accepted for publication in J. Am. Chem. Soc., 1967.

In the reaction of this invention lower carboxylic acids of the general formula RCOOH (R=H or an alkyl group consisting of 1–10 carbon atoms) can be employed. The carboxylic acid acts as a catalyst and a solvent. Suitable carboxylic acids include formic acid, acetic acid, propionic acid, butyric acid, valeric acid, caproic acid, heptoic acid, caprylic acid, pelargonic acid and capric acid. Acetic acid is the preferred carboxylic acid.

In this reaction the temperature to which the chrysanthenone carboxylic acid solution is heated ranges from about 40° to about 150° C. At temperatures below about 40° C. the conversion is impractically slow. At temperatures above about 150° C., other non-desired products are produced, i.e., isopiperitenone and piperitenone, and the yield of desired ketone II is reduced. The preferred temperature range is 70° C. to 125° C. Reaction times range from about 77 hours at 70° C. to about 1 hour at 125° C. Yields in the range of 25% to 75% are obtained.

Sufficient carboxylic acid to dissolve the chrysanthenone should be used. Excess carboxylic acid can be employed. The chrysanthenone can comprise about 0.1% to about 50% by weight of the carboxylic acid.

In order to obtain ketone II with a minimum of racemization, it is desirable to conduct the reaction for shorter reaction periods at lower temperatures (i.e., from about 0°–30° C.) with a stronger acid—e.g., boron trifluoride etherate, trichloroacetic acid, trifluoroacetic acid, hydrogen chloride, hydrogen bromide (i.e., Lewis acids with a $pK_A$ of less than 1) in an inert solvent (e.g., chlorinated solvents such as dichloroethane, aromatic hydrocarbon solvents such as benzene, toluene, and xylene, and hydrocarbon solvents such as cyclohexane and hexane). The chrysanthenone can comprise from about 0.1% to about 50% by weight of the inert solvent. Although the exact reaction period required to obtain maximum yields of II with minimum racemization should be determined for each Lewis acid catalyst employed, with boron trifluoride etherate, 500 mg. of ketone I is completely rearranged after 30 min. time. Longer reaction periods, higher temperatures and greater concentrations of acid convert the initially formed ketone II to isopiperitenone (see, for example, Examples IV and V). A small amount of another ketone—2,7,7 - trimethylbicyclo[3.2.0]hept-2-en-6-one) is also formed under these conditions. For this reason temperatures of 0–30° should be maintained and the concentration of Lewis acid should not exceed about 20% by weight. The Lewis acid ranges from about 1% to about 20% by weight of the inert solvent. Yields of ketone II under these conditions vary between 25–50%.

The following examples illustrate, but do not limit, the practice of the process of this invention.

Examples

General.—Infrared spectra were recorded on a Perkin-Elmer infrared spectrophotometer as films on sodium chloride plates or as 5% solutions in carbon tetrachloride. Nuclear magnetic resonance spectra were run as 10% solutions in carbon tetrachloride or deuterated chloroform on a Varian HA–100 spectrometer using tetramethylsilane as an internal reference. Gas chromatography separations were made on a 10 ft., 0.25 in. stainless steel column packed with 20% Reoplex 400 on 60–80 mesh WAWDMCS 300 (F&M Corporation). Specific rotations were obtained using a Rudolph Model 70 precision polarimeter with chloroform as solvent.

EXAMPLE I

Conversion of chrysanthenone (I) to 2,6,6-trimethylbicyclo[3.2.0]hept-2-en-7-one (II) in acetic acid at 118° C.

A solution of 505 mg. of chrysanthenone, $[\alpha]_D^{26} -13°$, prepared by a variation of the procedure of J. J. Hurst and G. H. Whitham, J. Chem. Soc., 2864 (1960) (see W. F. Erman, "Photochemical Transformations of Unsaturated Bicyclic Ketones. Verbenone and Its Photodynamic Products of Ultraviolet Irradiation," accepted for publication in J. Am. Chem. Soc. in 1967), in 15 ml. of glacial acetic acid was heated at reflux under a nitrogen atmosphere for a period of sixty minutes. The mixture was cooled to room temperature (about 26–27°), diluted with 15 ml. of water and the product extracted with 150 ml. of ether. The ethereal layer was washed with 3×25 ml. of water, 2×10 ml. of saturated potassium bicarbonate solution, and 3×25 ml. of water and dried over magnesium sulfate. Removal of solvent under reduced pressure afforded 448 mg. of residual liquid which, on analysis by gas chromatography at 110° to 150° (rate change 4.6°/min.) and helium flow of 70 to 60 ml./min. indicated the presence of four peaks: 2,6,6-trimethylbicyclo[3.2.0]hept-2-en-7-one (II, 71%, rel. ret. time 19.8 min.), isopiperitenone (7%, rel. ret. time 69.7 min.), unknown ketone (5%, rel. ret. time 70.1), and piperitenone (17%, rel. ret. time 78.1 min.), The liquid was subjected to short path distillation to yield 201 mg. (40% yield) of ketone II as a colorless liquid, B.P. (oil bath) 105° (10.6 mn.) and 59 mg. of a mixture of isopiperitenone (24%), unknown ketone (17), and piperitenone (59%).

The ketone II, was purified for analysis by preparative gas chromatography at 110° and 60 ml./min. helium flow, $[\alpha]_D^{26} +17.65°$ (c.=0.0102 in chloroform). The gas chromatography retention time and infrared and N.M.R. spectra of II were identical with those of an authentic specimen of 2,6,6-trimethylbicyclo[3.2.0]hept-2-en-7-one prepared by the method of J. J. Beereboom, J. Am. Chem. Soc., 85, 3525 (1963).

The isopiperitenone was isolated by preparative gas chromatography and its identity revealed by comparison of its gas chromatography retention time and infrared and N.M.R. spectra with that of an authentic specimen prepared according to the procedure of G. O. Schenck, O. A. Neumüller, G. Ohloff and S. Schroeter, Ann., 687, 26 (1965).

The gas chromatography retention time and infrared spectrum of piperitenone, isolated by preparative gas chromatography, was identical with that of an authentic specimen of this ketone prepared according to the method of C. Balant, C. A. Vodoz, H. Kappeler and H. Schinz, Helv. Chim. Acta, 34, 722 (1951).

EXAMPLE II

Conversion of chrysanthenone (I) to 2,6,6-trimethylbicyclo[3.2.0]hept-2-en-7-one (II) in acetic acid at 60°

A solution of 502 mg. of chrysanthenone, $[\alpha]_B^{26} -13°$, in 15 ml. of glacial acetic acid was heated at 60° C. under a nitrogen atmosphere for a period of 77 hours. The mixture was cooled to room temperature and diluted with 15 ml. of water. The product was extracted with 75 ml. of ether and the ethereal layer washed with 2×10 ml. of water, 7×10 ml. of saturated sodium bicarbonate, 3×10 ml. of water and dried over magnesium sulfate. Evaporation of ether under reduced pressure afforded 464 mg. of liquid which, on analysis by gas chromatography at 110° C. indicated the presence of ketone II (62%), ketone I (31%), isopiperitenone (2%) and piperitenone (5%).

Short path distillation afforded 218 mg. of a mixture of II and I, B.P. (oil bath) 100–125° (10.2–11.4 mm.) in the ratio 2:1 (144 mg. II, 28% yield) and 39 mg. of a mixture of I, II, isopiperitenone and piperitenone B.P. 125–150° (10.2 mm.) in the ratio of 1:1:2:4. Each of the ketones were isolated by preparative gas chromatography, the ketones I and II at 110° and 70 ml./min. helium flow, and isopiperitenone and piperitenone at 150° and 60 ml./min. helium flow.

The ketone II possessed $[\alpha]_D^{26} +24.2°$ (c=0.0079 in chloroform). The gas chromatography retention time and infrared and N.M.R. spectral properties of this ketone were identical with those of the authentic specimen as described for the 118° run. The isopiperitenone and piperitenone were identified as described above.

EXAMPLE III

Conversion of chrysanthenone (I) to 2,6,6-trimethylbicyclo[3.2.0]hept-2-en-7-one (II) with boron trifluoride etherate To a solution 505 mg. of chrysanthenone $[\alpha]_D^{26} -41°$ in 15 ml. of 1,2-dichloroethane was added 1.5 ml. of freshly distilled boron trifluoride etherate and this mixture stored at room temperature (26–27° C.) for 30 min. under a nitrogen atmosphere. The mixture was cautiously poured into 20 ml. of water and extracted with 100 ml. of ether. The etheral layer was washed with 10 ml. of saturated sodium bicarbonate, 4×20 ml. of water and dried over magnesium sulfate. Removal of ether under reduced pressure afforded 478 mg. of liquid, which, on analysis by gas chromatography at 110° and 60 ml./min. helium flow, was shown to consist of two peaks, ketone II, 78% and isopiperitenone, 22%. Short path distillation afforded 130 mg. (26%) of ketone II, B.P. (bath temp.) 110–115°, (10.2–11.6 mm.), $[\alpha]_D^{26} +185°$ (C=0.0116 in chloroform) and 52 mg. of isopiperitenone and ketone II in the ratio 4:1. The isopiperitenone was collected by gas chromatography and identified as above. The spectral properties of ketone II were compared with authentic ketone II as above.

EXAMPLE IV

Conversion of chrysanthenone (I) to isopiperitenone with boron trifluoride etherate The same procedure was employed as above except that the solution of I, $[\alpha]_D^{26} -41°$, in boron trifluoride etherate-1,2 dichloroethane solution was stored for a period of 2 hours, 25 min. After work-up and short-path distillation as above there was obtained 155 mg. of a mixture of ketone II (22%), a ketone assigned the structure 2,7,7-trimethylbicyclo[3.2.0]hept-2-en-7-one (6%), isopiperitenone (66%) and piperitenone (6%). Isolation and identification of the products by gas chromatography was effected as above at 110° and 60 ml./min. helium flow. The isopiperitenone isolated from this run showed $$[\alpha]_D^{25} +20.4°$$

EXAMPLE V

Conversion of 2,6,6-trimethylbicyclo[3.2.0]hept-2-en-7-one (II) to isopiperitenone with boron trifluoride etherate The procedure was essentially the same as that described for the above conversion of ketone I to isopiperitenone with boron trifluoride etherate. Treatment of 505 mg. of (I)-2,6,6-trimethylbicyclo[3.2.0]hept-2-en-7-one with 1.5 ml. of boron trifluoride etherate in 15 ml. of 1,2-dichloroethane afforded, after work-up and distillation, 224 mg. of liquid, B.P. 110–156° (2.0–11.0 mm.) consisting of ketone II(17%), 2,7,7-trimethylbicyclohept-2-en-6-one (6%), isopiperitenone (61%), piperitenone (10%), and an unidentified ketone (6%). The ketones were isolated by gas chromatography as above and identified by comparison of spectral properties with authentic specimens.

The 2,6,6-trimethylbicyclo[3.2.0]hept-2-en-7-one produced by the process of this invention is optically active and possesses a valuable and desirable green, herbaceous, phenylacetaldehyde note which can be used in rose perfumes and floral fruit flavors. Rose perfumes are valuable for use in soap bars and the like. Floral fruit flavors are valuable in chewing gum, jellies and the like.

Optical activity is a desirable analytical advantage, i.e., reactions involving ketone II thereby can be better understood, followed and controlled. For example, ketone II can be employed as an intermediate in preparing optically active monoterpene perfume materials such as isopiperitenone.

What is claimed is:

1. A process for producing optically active 2,6,6-trimethyl-bicyclo[3.2.0]hept-2-en-7-one comprising the step of treating a solution of chrysanthenone with (a) acetic acid which is employed as the solvent and the treatment temperature is in the range of about 70° C. to about 125° C. or with (b) boron trifluoride etherate which is employed as a catalyst, in an inert solvent at temperatures ranging from about 0° C. to about 30° C.

References Cited

Retamar, "Chem. Abst.," col. 16772(b) (1962) QD1A51.

De Pascual Teresa, Anales Real Soc. Espan. Fis. Quim. (Madrid) Ser. B, pp. 345, 347, 349, 350 (1962) QD1.538.

Chretien-Bessiere et al., Bull. Ch. Soc. Fr., pp. 884–885 (1963) QD1.54.

LEON ZITVER, *Primary Examiner.*

M. JACOB, *Assistant Examiner.*

U.S. Cl. X.R.

260—587